(12) United States Patent
Oertel et al.

(10) Patent No.: US 12,723,890 B2
(45) Date of Patent: Sep. 1, 2026

(54) METHOD AND DEVICE FOR CREATING A DIGITAL MAP

(71) Applicant: Robert Bosch GmbH, Stuttgart (DE)

(72) Inventors: David Oertel, Hannover (DE); Hans-Georg Raumer, Hildesheim (DE); Max Kirstein, Hohenhameln—Ot Bruendeln (DE); Thomas Wenzel, Hamburg (DE); Thorben Funke, Sarstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 58 days.

(21) Appl. No.: 18/897,431

(22) Filed: Sep. 26, 2024

(65) Prior Publication Data

US 2025/0123116 A1 Apr. 17, 2025

(30) Foreign Application Priority Data

Oct. 13, 2023 (DE) ..................... 10 2023 210 070.3

(51) Int. Cl.
*G01C 21/00* (2006.01)
*G06V 10/82* (2022.01)

(52) U.S. Cl.
CPC ......... *G01C 21/3833* (2020.08); *G06V 10/82* (2022.01)

(58) Field of Classification Search
CPC ............................ G01C 21/3833; G06V 10/82
See application file for complete search history.

(56) References Cited

U.S. PATENT DOCUMENTS

2019/0049982 A1* 2/2019 Yang .................... G05D 1/0221
2019/0259134 A1 8/2019 Jeffrey
2020/0286247 A1* 9/2020 Niesen .................. G01S 13/867
2021/0142160 A1* 5/2021 Mohseni ................ G06N 3/088
2022/0238031 A1* 7/2022 Evans .................... G06V 10/25
2023/0046274 A1* 2/2023 Chen ..................... G01S 13/931

FOREIGN PATENT DOCUMENTS

DE 102019208735 A1 12/2020
DE 112019002589 T5 8/2021

OTHER PUBLICATIONS

Norm Sae J3016 (2014): Taxonomy and Definitions for Terms Related to On-Road Motor Vehicle Automated Driving Systems, SAE International, pp. 1-12.

* cited by examiner

*Primary Examiner* — Hussein Elchanti
(74) *Attorney, Agent, or Firm* — NORTON ROSE FULBRIGHT US LLP

(57) ABSTRACT

A method and device for creating a digital map. The method includes: receiving first training data sets; generating second training data sets by means of a generative neural network by determining a second, perturbed image of the same surrounding area in each case for each first image, wherein each second training data set represents the second image of the corresponding first image; training a further neural network; receiving surrounding area data sets, which in each case represent a surrounding area image of a vehicle surrounding area, wherein these surrounding area data sets comprise a position description of the corresponding vehicle surrounding area; creating the digital map by merging the surrounding area images, depending on the position description, by means of a scan matching method, wherein the scan matching method includes at least the further neural network, and a step of providing the digital map.

6 Claims, 1 Drawing Sheet

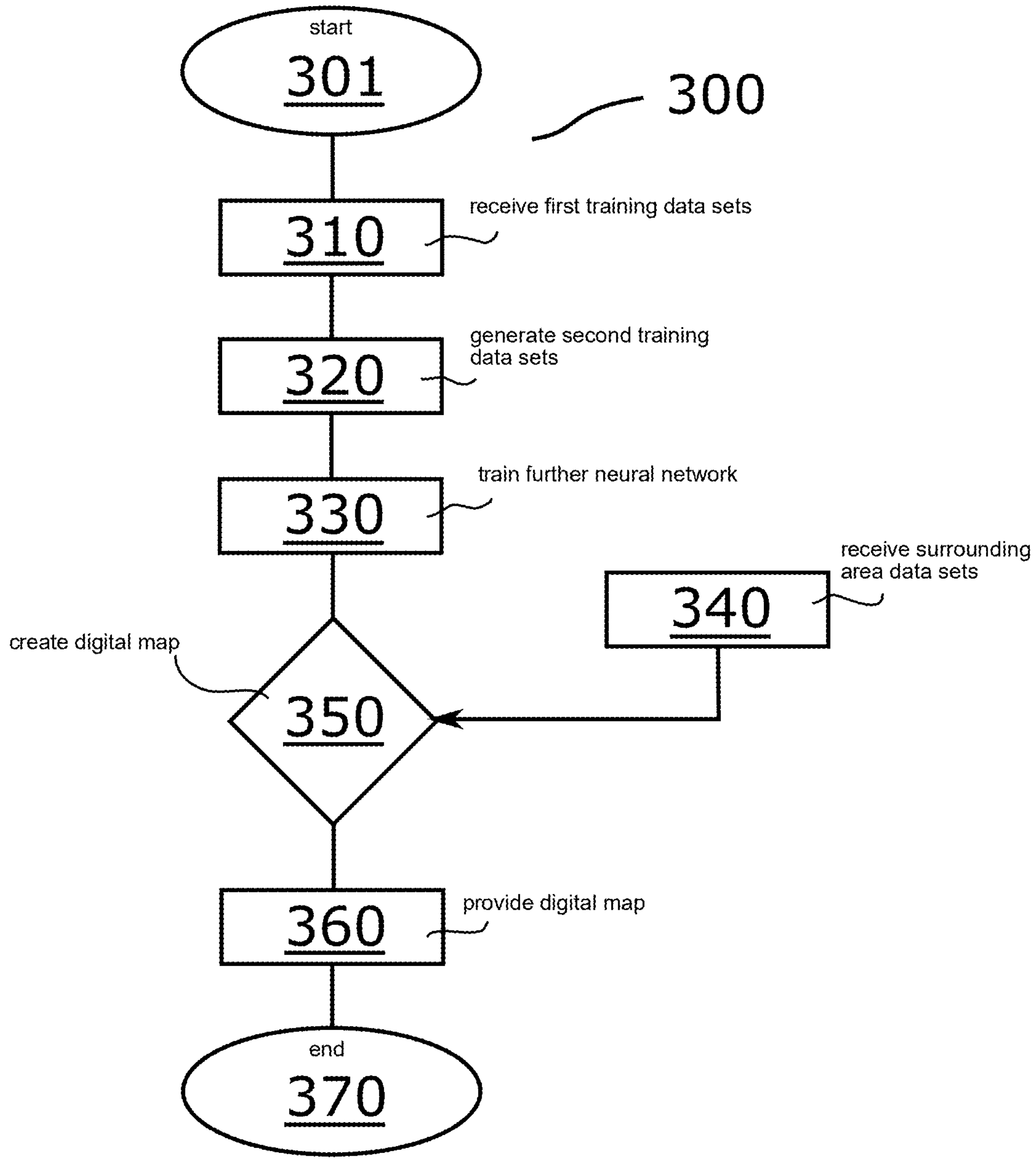
start
301
300
310
receive first training data sets
320
generate second training data sets
330
train further neural network
340
receive surrounding area data sets
create digital map
350
360
provide digital map
end
370

METHOD AND DEVICE FOR CREATING A DIGITAL MAP

CROSS REFERENCE

The present application claims the benefit under 35 U.S.C. § 119 of German Patent Application No. DE 10 2023 210 070.3 filed on Oct. 13, 2023, which is expressly incorporated herein by reference in its entirety.

FIELD

The present invention inter alia relates to a method for creating a digital map by merging surrounding area images, which in each case represent a surrounding area image of a vehicle's surrounding area, depending on a position description, by means of a scan matching method, wherein the scan matching method comprises at least one neural network.

SUMMARY

According to an example embodiment of the present invention, the method for creating a digital map comprises a step of receiving first training data sets, wherein each first training data set represents a first image of a corresponding surrounding area, a step of generating second training data sets by means of a generative neural network by determining a second, perturbed image of the same surrounding area in each case for each first image, and a step of training a further neural network, which is designed to merge the first image of a first training data set and the corresponding second image of a second training data set according to specified criteria. The method further comprises a step of receiving surrounding area data sets, which in each case represent a surrounding area image of a vehicle surrounding area, wherein these surrounding area data sets comprise a position description of the corresponding vehicle surrounding area, a step of creating the digital map by merging the surrounding area images, depending on the position description, by means of a scan matching method, wherein the scan matching method comprises at least the further neural network, and a step of providing the digital map.

A digital map is understood to mean a map that is present in the form of (map) data values on a storage medium. For example, the map is designed to comprise one or more map layers, wherein one map layer, for example, shows a map from the bird's eye view (course and position of roads, buildings, landscape features, etc.). This corresponds to a map of a navigation system, for example. A further map layer comprises, for example, a radar map, wherein surrounding area features comprised by the radar map are stored along with a radar signature. A further map layer comprises, for example, a lidar map, wherein surrounding area features comprised by the lidar map are stored along with a lidar signature.

In one example embodiment of the present invention, the map is designed as a highly accurate map. The highly accurate map is in particular designed in such a way that it is suitable for the navigation of an automated vehicle. This is understood to mean, for example, that the highly accurate map is designed to determine a highly accurate position of this automated vehicle by comparing stored surrounding area features with detected sensor data values of this automated vehicle. For this purpose, the highly accurate map, for example, comprises said surrounding area features along with highly accurate position specifications (coordinates). In this context, a map is in particular understood to mean a globally accurate map.

A highly accurate position is understood to mean a position which is accurate within a specified coordinate system, e.g., WGS84 coordinates, in such a way that this position does not exceed a maximum permitted uncertainty. The maximum uncertainty may depend on the surrounding area, for example. Furthermore, the maximum uncertainty can depend, for example, on whether a vehicle is operated manually or in a partially, highly or fully automated manner (corresponding to one of SAE levels 1 to 5). In principle, the maximum uncertainty is so low that safe operation of the automated vehicle is in particular ensured. For a fully automated operation of the automated vehicle, the maximum uncertainty is, for example, in an order of magnitude of about 10 centimeters.

A first image of a corresponding surrounding area is understood to mean an image that was detected by means of sensors such as video, radar, ultrasound or lidar. The corresponding first training data sets can also represent different (spatially separated) surrounding areas. In general, a surrounding area is understood to mean a region that can be detected by means of corresponding sensors. This may, for example, be the region of a traffic intersection or the region along a traffic route. A traffic route is understood to mean, for example, a single-lane or multi-lane road. A region along a traffic route is understood to mean, for example, the traffic route itself along with a strip to the left and/or right of the traffic route. The width of the strip depends, for example, on the specific configuration of the surrounding area and/or the sensor range of the individual vehicles. As a rule, this strip comprises surrounding area features, such as traffic signs, etc. In one possible embodiment, the first images are parameterized by means of polygons and/or point clouds.

A position description is understood to mean, for example, a position specification of the vehicle that has detected the surrounding area by means of a surrounding area sensor system. This is understood to mean a position within a specified coordinate system, e.g., WGS84 coordinates. In one embodiment, the position specification can also refer to a position of an object in the surrounding area, wherein this object is comprised in the corresponding surrounding area data sets. The position of the corresponding object can be determined from a combination of a vehicle position of the vehicle, which detects this surrounding area feature, and a relative position of this surrounding area feature with respect to this vehicle and is assigned to this surrounding area feature. In a possible embodiment, the vehicle position of the vehicle is determined by means of a satellite-based positioning system for said vehicle and the relative position is determined from the corresponding surrounding area data set.

A surrounding area sensor system is understood to mean at least one video sensor and/or at least one radar sensor and/or at least one lidar sensor and/or at least one ultrasonic sensor and/or at least one further sensor that is designed to detect the surrounding area of a vehicle in the form of surrounding area data values. In one possible embodiment, the surrounding area sensor system comprises, for example, a computing unit (processor, working memory, hard drive) with suitable software and/or is connected to such a computing unit for this purpose.

A surrounding area feature is understood here to mean, for example, an infrastructure feature (roadway boundary lines, guardrails, etc.) and/or a traffic sign (road signs, traffic lights, etc.) and/or a structural feature (buildings, bridges, tunnels, etc.) and/or a further feature that can be detected by means of a surrounding area sensor system.

Creating the digital map is understood to mean, for example, that surrounding area features, which in each case are comprised by a corresponding surrounding area image, are newly integrated into a base map according to their position (here: position description) and/or corresponding surrounding area features already comprised by the base map are removed or adjusted. Here, a base map is understood to mean in particular a digital map (as described above).

The method according to the present invention advantageously achieves the object of providing a method for creating a digital map. This object is in particular achieved by means of the method according to the present invention by creating in each case new, suitable map sections from existing map sections (here: surrounding area images). For training, the neural networks used for this purpose require a large number of suitable data sets, which must be collected with great effort. By means of the method described here, existing data sets can be augmented or artificially newly generated in order to use them to train a machine-learning-based scan matching method. In particular, disturbances caused by sensor noise and downstream algorithmic processing are learned in an automated or data-driven manner in this way. As a result, the method described here also reduces the effort required to collect data, since a small amount of real data is sufficient to generate a larger data set consisting of real and artificial data and to subsequently use it to train a neural network. This means that the existence of a few map sections can be used to generate or expand a larger data set.

According to an example embodiment of the present invention, preferably, the generative neural network was previously trained by means of training image pairs, wherein each training image pair represents two different images of a spatial scene.

In each case, training image pairs are understood to mean a pair of two images of the same spatial scene, which were previously detected by means of sensors such as video, radar, ultrasound or lidar. These images are obtained, for example, by a plurality of vehicles with corresponding sensors detecting the same spatial scene or the same location (the same surrounding area) and by the same vehicle detecting the same spatial scene several times. The corresponding images are available in particular in the form of point clouds.

The generative neural network is, for example, a so-called variation autoencoder or variational autoencoder (VAE).

According to an example embodiment of the present invention, preferably, the first training data sets represent the first image and/or the second training data sets represent the second image and/or the surrounding area data sets represent the surrounding area image, in each case in the form of point clouds.

A point cloud is understood to mean a digital 2D or 3D representation of a physical object or space or a spatial scene. It consists of a large number of individual measuring points, which in each case have an x- and y-coordinate or x-, y- and z-coordinate.

According to an example embodiment of the present invention, preferably, the digital map is provided for operating an automated vehicle.

An automated vehicle is understood to mean a semi-, highly or fully automated vehicle according to one of SAE levels 1 to 5 (see standard SAE J3016).

Operating an automated vehicle is understood to mean, for example, executing a lateral and/or longitudinal control of the automated vehicle, wherein the lateral and/or longitudinal control is effected in such a way that the automated vehicle moves along a trajectory at a specified speed. In one possible embodiment, the operation also comprises, for example, the execution of safety-relevant functions ("arming" an airbag, fastening seat belts, etc.) and/or further (driving assistance) functions.

A trajectory is understood to mean, for example, in relation to a map, a line that an (automated) vehicle follows at a specified speed. In one embodiment, this line refers, for example, to a fixed point on the vehicle. In a further possible embodiment, a trajectory is understood to mean, for example, a travel route envelope through which the vehicle drives.

According to an example embodiment of the present invention, the device, in particular a computing unit, is configured to perform all steps of the method according to the present invention for creating a digital map. A computing unit is understood to mean, for example, a server or a server network or a cloud.

According to an example embodiment of the present invention, the device or computing unit comprises a processor, working memory, storage medium, and suitable software in order to perform the method according to one of the method embodiments of the present invention. Furthermore, the device comprises an interface in order to transmit and receive data values by means of a wired and/or wireless connection, for example with corresponding devices of vehicles (control units, communication devices, surrounding area sensor system, navigation system, etc.) and/or further off-board devices (server, cloud, etc.).

Furthermore, according to an example embodiment of the present invention, a computer program is provided, comprising commands that, when the computer program is executed by a computer, cause the computer to perform a method according to one of the methods for creating a digital map. In one embodiment, the computer program corresponds to the software comprised by the second device.

Furthermore, a machine-readable storage medium on which the computer program is stored is provided according to an example embodiment of the present invention.

Advantageous developments and example embodiments of the present invention are disclosed herein.

BRIEF DESCRIPTION OF THE DRAWING

Exemplary embodiments of the present invention are shown in the FIGURE and explained in more detail in the following description.

FIG. 1 shows an exemplary embodiment of the method according to the present invention for creating a digital map in the form of a flow chart.

DETAILED DESCRIPTION OF EXAMPLE EMBODIMENTS

FIG. 1 shows an exemplary embodiment of a method 300 for creating 350 a map.

In step 301, the method 300 starts.

In step 310, N first training data sets $x_i$, i=1, . . . , N are received, wherein each first training data set $x_i$ represents a first image of a corresponding surrounding area.

In step 320, N second training data sets $y_i$, i=1, . . . , N are generated by means of a generative neural network by determining a second, perturbed image of the same surrounding area in each case for each first image. Thus, for each first training data set $x_i$, a corresponding second training data set $y_i$ is generated, wherein this second training data set $y_i$ represents the second image for the corresponding first image of the first training data set $x_i$.

In step 330, a further neural network is trained, which is designed to merge the first image of a first training data set and the corresponding second image of a second training data set according to specified criteria.

Merging is understood to mean that the corresponding first image and the second image generated from it are aligned with one another. The specified criteria correspond, for example, to a specified accuracy, which is achieved by training the further neural network to find or learn the best possible approximating transformation.

In step 340, surrounding area data sets, which in each case represent a surrounding area image of a vehicle surrounding area, are received, wherein these surrounding area data sets comprise a position description of the corresponding vehicle surrounding area.

In step 350, the digital map is created by merging the surrounding area images, depending on the position description, by means of a scan matching method, wherein the scan matching method comprises at least the further neural network. In one possible embodiment, the scan matching method also comprises a linear transformation and/or rotation of the surrounding area images.

In step 360, the digital map is provided.

In step 370, the method 300 ends.

What is claimed is:

1. A method for creating a digital map, comprising the following steps:

receiving first training data sets, wherein each of the first training data sets represents a first image of a corresponding surrounding area;

generating second training data sets using a generative neural network by determining a corresponding second, perturbed image of the same surrounding area in each case for each first image;

training a further neural network, which is configured to merge the first image of a first training data set and the corresponding second perturbed image of a second training data set according to specified criteria;

receiving surrounding area data sets, which in each case represent a surrounding area image of a corresponding vehicle surrounding area, wherein the surrounding area data sets include a position description of the corresponding vehicle surrounding area;

creating the digital map by merging the surrounding area images, depending on the position description, using a scan matching method, wherein the scan matching method includes at least the further neural network; and providing the digital map.

2. The method according to claim 1, wherein the generative neural network was previously trained using training image pairs, wherein each training image pair represents two different images of a spatial scene.

3. The method according to claim 1, wherein the first training data sets represent the first image and/or the second training data sets represent the second image and/or the surrounding area data sets represent the surrounding area image, in each case in the form of point clouds.

4. The method according to claim 1, wherein the digital map is provided for operating an automated vehicle.

5. A device, comprising:

a computing unit configured to create a digital map, the computing unit configured to:

receive first training data sets, wherein each of the first training data sets represents a first image of a corresponding surrounding area, generate second training data sets using a generative neural network by determining a corresponding second, perturbed image of the same surrounding area in each case for each first image, train a further neural network, which is configured to merge the first image of a first training data set and the corresponding second perturbed image of a second training data set according to specified criteria, receive surrounding area data sets, which in each case represent a surrounding area image of a corresponding vehicle surrounding area, wherein the surrounding area data sets include a position description of the corresponding vehicle surrounding area, create the digital map by merging the surrounding area images, depending on the position description, using a scan matching method, wherein the scan matching method includes at least the further neural network, and provide the digital map.

6. A non-transitory machine-readable storage medium on which is stored a computer program including commands for creating a digital map, the commands, when executed by a computer, causing the computer to perform the following steps:

receiving first training data sets, wherein each of the first training data sets represents a first image of a corresponding surrounding area;

generating second training data sets using a generative neural network by determining a corresponding second, perturbed image of the same surrounding area in each case for each first image;

training a further neural network, which is configured to merge the first image of a first training data set and the corresponding second perturbed image of a second training data set according to specified criteria;

receiving surrounding area data sets, which in each case represent a surrounding area image of a corresponding vehicle surrounding area, wherein the surrounding area data sets include a position description of the corresponding vehicle surrounding area;

creating the digital map by merging the surrounding area images, depending on the position description, using a scan matching method, wherein the scan matching method includes at least the further neural network; and providing the digital map.

* * * * *